United States Patent
Palczynski, Jr.

(10) Patent No.: US 7,518,342 B2
(45) Date of Patent: Apr. 14, 2009

(54) APPARATUS AND METHOD FOR EFFECTING POWER DISTRIBUTION TO A HOST SYSTEM FROM A VOLTAGE SOURCE OR A BATTERY

(75) Inventor: John Joseph Palczynski, Jr., Hopkinton, MA (US)

(73) Assignee: Texas Instruments Incorporated, Dallas, TX (US)

( * ) Notice: Subject to any disclaimer, the term of this patent is extended or adjusted under 35 U.S.C. 154(b) by 292 days.

(21) Appl. No.: 11/261,092

(22) Filed: Oct. 28, 2005

(65) Prior Publication Data

US 2007/0096693 A1    May 3, 2007

(51) Int. Cl.
*H02J 7/04* (2006.01)
*H02J 7/00* (2006.01)

(52) U.S. Cl. .................... 320/139; 307/66; 320/128; 320/135; 320/164

(58) Field of Classification Search ............... 320/128, 320/135, 139, 152, 159, 164; 307/66
See application file for complete search history.

(56) References Cited

U.S. PATENT DOCUMENTS

| | | | |
|---|---|---|---|
| 6,414,403 B2 * | 7/2002 | Kitagawa et al. ............ | 307/66 |
| 6,597,074 B2 * | 7/2003 | Tsujikado et al. ............ | 307/66 |
| 7,199,537 B2 * | 4/2007 | Okamura et al. ............ | 318/139 |
| 2003/0184937 A1 * | 10/2003 | Kanouda et al. ............ | 361/90 |

OTHER PUBLICATIONS

Cleveland, Terry L.; "Bi-Directional Power System for Laptop Computers"; 0-7803-8975-1/05; copyright 2005 IEEE.

* cited by examiner

*Primary Examiner*—Jessica Han
*Assistant Examiner*—Emily Pham
(74) *Attorney, Agent, or Firm*—John J. Patti; Wade J. Brady, III; Frederick J. Telecky, Jr.

(57) ABSTRACT

An apparatus for effecting power distribution to a host system at a supply locus from one of a voltage source or a battery includes: (a) a current transfer unit having a first and a second connection; the second connection being coupled with the battery; and (b) a control device switchingly coupling the first connection to effect alternating connection with the voltage source and with a low potential. The control device is sensingly coupled with the voltage source and within the apparatus for receiving indicating signals. The control device responds to the indicating signals to control the alternating connection to achieve stepped up delivery of voltage presented by the battery unit to the supply locus when the indicating signals indicate a first circumstance. The control device responds to the indicating signals to switchingly control the alternating connection to achieve charging the battery when the indicating signals indicate a second circumstance.

20 Claims, 2 Drawing Sheets

US 7,518,342 B2

APPARATUS AND METHOD FOR EFFECTING POWER DISTRIBUTION TO A HOST SYSTEM FROM A VOLTAGE SOURCE OR A BATTERY

BACKGROUND OF THE INVENTION

The present invention is directed to power distribution control apparatuses. The invention is especially directed to power distribution control apparatuses in battery backed-up host systems that automatically provide power from a normal power source, such as house current, or from a battery unit depending on circumstances sensed by the apparatus itself.

A common configuration employed in battery backed-up systems is to use high voltage stepped down to charge a low voltage battery when the high voltage is present. When the high voltage is removed, the battery voltage is then stepped up by a step-up converter to provide power to the host system. In prior art configurations of such systems, two separate converters are used: a step-down converter to use the high voltage for providing a charging voltage, and a step-up converter to step up the battery voltage to a level appropriate for powering the host system. Using two converters contributes to requiring larger die space, higher part count, greater complexity and consequent possible greater opportunity for breakdown than would be experienced if a simpler configuration were employed.

There is a need for an apparatus and method for effecting power distribution to a host system from a voltage source or a battery that requires smaller die space and lower part count than are required for prior art power distribution control apparatuses.

SUMMARY OF THE INVENTION

An apparatus for effecting power distribution to a host system at a supply locus from one of a voltage source or a battery includes: (a) a current transfer unit having a first and a second connection; the second connection being coupled with the battery; and (b) a control device switchingly coupling the first connection to effect alternating connection with the voltage source and with a low potential. The control device is sensingly coupled with the voltage source and within the apparatus for receiving indicating signals. The control device responds to the indicating signals to control the alternating connection to achieve stepped up delivery of voltage presented by the battery unit to the supply locus when the indicating signals indicate a first circumstance. The control device responds to the indicating signals to switchingly control the alternating connection to achieve charging the battery when the indicating signals indicate a second circumstance.

A method for effecting power distribution to a host system at a system supply locus from one of a voltage supply source or a battery unit includes the steps of: (a) In no particular order: (1) providing a current transfer unit having a first connection locus and a second connection locus; the second connection locus being coupled with the battery unit; and (2) providing a control device switchingly coupled with the first connection locus; the control device being sensingly coupled with the voltage supply source and within the apparatus for receiving a plurality of indicating signals. (b) Operating the control device to effect generally alternating connection with the voltage supply source and with a system low potential locus. (c) Operating the control device to respond to the plurality of indicating signals to control the generally alternating connection to achieve stepped up voltage delivery of voltage presented by the battery unit to the system supply locus when the plurality of indicating signals indicates a first circumstance. (d) Operating the control device to respond to the plurality of indicating signals to switchingly control the generally alternating connection to achieve charging the battery unit when the plurality of indicating signals indicates a second circumstance.

It is, therefore, an object of the present invention to provide an apparatus and method for effecting power distribution to a host system from a voltage source or a battery that requires smaller space and lower part count than are required for prior art power distribution control apparatuses.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
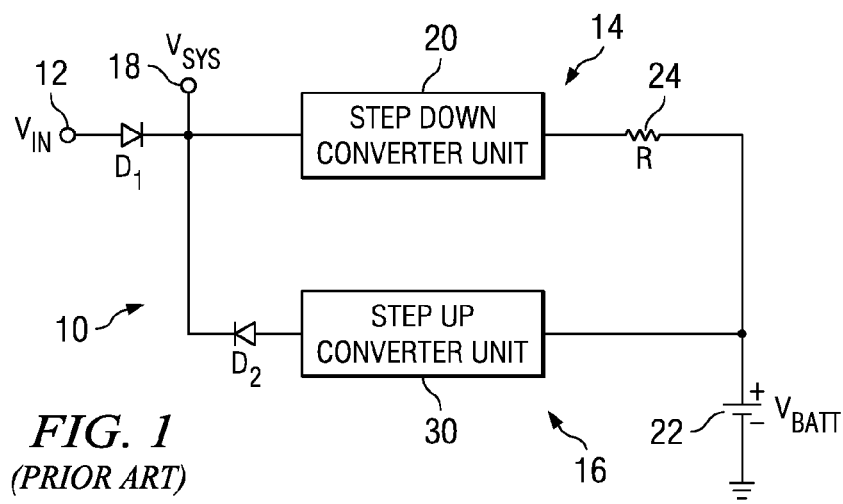
FIG. 1 is an electrical schematic diagram of a prior art power distribution apparatus.

FIG. 1 is an electrical schematic diagram of a prior art power distribution apparatus. In FIG. 1, a power distribution control apparatus 10 is coupled with a voltage supply source 12. An input voltage $V_{IN}$ may be applied to voltage supply source 12 from a voltage source such as a dc voltage derived from a 60 cycle 110 volt house supply (not shown in FIG. 1). Apparatus 10 includes a step-down section 14 and a step-up section 16. Step-down section 14 is coupled with a system supply locus 18. System supply locus 18 is coupled with a host system (not shown in FIG. 1) for providing operating power to the host system. A system supply voltage $V_{SYS}$ is provided to the host system at system supply locus 18 by apparatus 10. A diode $D_1$ is coupled between voltage supply source 12 and system supply locus 18. Diode $D_1$ is coupled to permit current flow from voltage supply source 12 toward system supply locus 18 and resist current flow from system supply locus 18 toward voltage supply source 12. Step-down section 14 includes a step-down converter unit 20 coupled with a battery unit 22. A resistor 24 may be included in series between step-down converter unit 20 and battery unit 22. Battery unit 22 provides a battery voltage $V_{BATT}$.

Step-up section 16 is also coupled with system supply locus 18. Step-up section 16 includes a step-up converter unit 30 coupled with battery unit 22. A diode $D_2$ is coupled between system supply locus 18 and step-up converter unit 30.

When input voltage $V_{IN}$ is greater than system voltage $V_{SYS}$ (i.e., when $V_{IN} > V_{SYS}$), step-down converter unit 20 charges battery unit 22 through resistor 24. Because $V_{IN} > V_{BATT}$ diode $D_2$ prevents current flow from $V_{IN}$ into battery unit 22 though step-up converter unit 30. In such a circumstance (i.e., when $V_{IN} > V_{SYS}$), input voltage $V_{IN}$ is provided as system supply voltage $V_{SYS}$ to system supply locus 18 and is employed to effect charging of battery unit 22.

When input voltage $V_{IN}$ is less than system voltage $V_{SYS}$ (i.e., when $V_{IN}<V_{SYS}$), diode $D_1$ prevents current flow to voltage supply source 12 through diode $D_1$, and diode $D_2$ permits current flow from battery unit 22 through step up-converter unit 30 to system supply locus 18. In such a circumstance (i.e., when $V_{IN}<V_{SYS}$), battery voltage $V_{BATT}$ is stepped up and provided as system supply voltage $V_{SYS}$ to system supply locus 18.

Apparatus 10 employs two separate converters: (1) step-down converter unit 20 to use the input voltage $V_{IN}$ for providing system supply voltage $V_{SYS}$ to system supply locus 18 and providing a charging voltage to battery unit 22; and (2) step-up converter unit 30 to step up battery voltage $V_{BATT}$ to be provided as system supply voltage $V_{SYS}$ at system supply locus 18. Using two converters 20, 30 contributes to apparatus 10 requiring larger space, higher part count, greater complexity and consequent greater opportunity for breakdown than would be experienced if a simpler configuration were employed.

Figure 2:
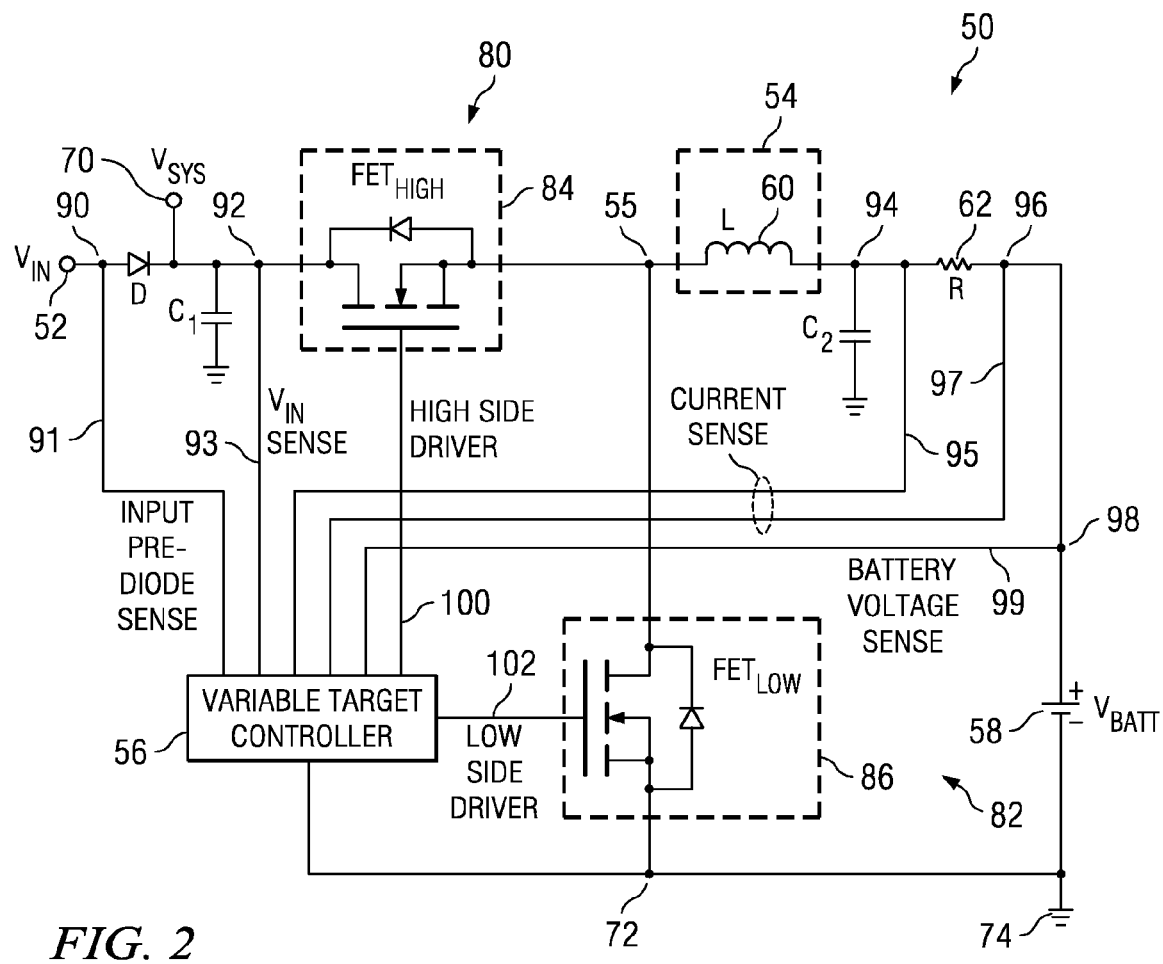
FIG. 2 is an electrical schematic diagram of a power distribution apparatus configured according to the teachings of the present invention.

FIG. 2 is an electrical schematic diagram of a power distribution apparatus configured according to the teachings of the present invention. In FIG. 2, a power distribution control apparatus 50 is coupled with a voltage supply source 52. An input voltage $V_{IN}$ may be applied to voltage supply source 52 from a voltage source such as, by way of example and not by way of limitation, a dc voltage derived from a 60 cycle 110 volt house supply (not shown in FIG. 2). Apparatus 50 includes a current transfer unit 54, a control device 56 and a battery unit 58. Battery unit 58 provides a battery voltage $V_{BATT}$. Current transfer unit 54 is illustrated, by way of example and not by way of limitation, as a boost converter unit embodied in an inductor 60. Other configurations may also be employed to serve the functions of current transfer unit 54. Current transfer unit 54 is switchingly coupled with a system supply locus 70. System supply locus 70 is coupled with a host system (not shown in FIG. 2) for providing operating power to the host system. A system supply voltage $V_{SYS}$ is provided to the host system at system supply locus 70 by apparatus 50. A diode D is coupled between voltage supply source 52 and system supply locus 70. Diode D is coupled to permit current flow from voltage supply source 52 toward system supply locus 70 and resist current flow from system supply locus 70 toward voltage supply source 52.

Current transfer unit 54 is switchingly coupled with system supply locus 70 via a high circuit path 80. Current transfer unit 54 is also switchingly coupled with a low potential locus 72 via a low circuit path 82. By way of example and not by way of limitation, low potential locus 72 is coupled with ground 74 in apparatus 50. Other configurations may, for example, establish low potential locus 72 at a lower operating voltage rail in a system having a voltage above ground.

High circuit path 80 is switchingly controlled by a high-side switch unit 84. Low circuit path 82 is switchingly controlled by a low-side switch unit 86. Switch units 84, 86 respond to control signals presented by control device 56 to alternately couple current transfer unit 54 with system supply locus 70 and low potential locus 72. Switch units 84, 86 may be configured in a simplified arrangement as a single pole, multi-throw switch selectively connecting a circuit locus 55 with system supply locus 70 or low potential locus 72. In the preferred embodiment of apparatus 50 illustrated in FIG. 2, switch unit 80 is embodied in a MOSFET (Metal Oxide Semiconductor Field Effect Transistor) $FET_{HIGH}$ and switch unit 82 is embodied in a MOSFET $FET_{LOW}$. Preferably, switch units 80, 82 are operated according to a repetitive cycle to control high circuit path 80 and low circuit path 82:

| | |
|---|---|
| High Circuit Path 80 | CLOSED |
| Both Circuit Paths 80, 82 | OPEN |
| Low Circuit Path 82 | CLOSED |
| Both Circuit Paths 80, 82 | OPEN |
| . . . and repeat | |

Control device 56 is sensingly coupled with voltage supply source 52 and within apparatus 50 to provide indicator signals or sense signals to control device 56. Control device 56 receives an input voltage indicating signal line 91 from a circuit locus 90. Circuit locus 90 is electrically common with voltage supply source 52 so input voltage indicating signals received by control device 56 via indicating line 91 provide an indication to control device 56 of the value of input voltage $V_{IN}$. Control device 56 receives a system supply voltage indicating signal line 93 from a circuit locus 92. Circuit locus 92 is electrically common with system supply locus 70 system supply voltage indicating signals received by control device 56 via indicating line 93 provide an indication to control device 56 of the value of system supply voltage $V_{SYS}$. Control device 56 receives a current indicating signal line 95 from a circuit locus 94 and receives a current indicating signal line 97 from a circuit locus 96. Current indicating signals received by control device 56 via indicating lines 95, 97 provide indications to control device 56 of the direction and magnitude of current through a resistor 62. Control device 56 receives a battery voltage indicating signal line 99 from a circuit locus 98. Circuit locus 98 is electrically common with battery unit 58 so battery voltage indicating signals received by control device 56 via indicating line 99 provide an indication to control device 56 of the value of battery voltage $V_{BATT}$.

Control device 56 provides control signals or drive signals to high-side switch unit 84 via a drive line 100. Control device 56 provides control signals or drive signals to low-side switch unit 86 via a drive line 102.

Control device 56 may evaluate or compare indicating signals received via indicating signal lines 91, 93 to observe a voltage difference $\Delta V$ between input voltage $V_{IN}$ and system supply voltage $V_{SYS}$. Control device 56 may compare voltage difference $\Delta V$ with a predetermined voltage difference threshold $\Delta V_{TH}$ to determine whether input voltage $V_{IN}$ is present and providing system supply voltage $V_{SYS}$ to the host system at system supply locus 70.

Control device 56 may evaluate or compare indicating signals received via indicating signal lines 95, 97 to observe direction and magnitude of current through resistor 62. If voltage difference threshold $\Delta V_{TH}$ indicates that input voltage $V_{IN}$ is not present and not providing system supply voltage $V_{SYS}$ to the host system at system supply locus 70, or if current through resistor 62 flows from battery unit 58 toward system supply locus 70, then apparatus 50 is in a configuration appropriate for providing stepped up voltage from battery voltage $V_{BATT}$ as system supply voltage $V_{SYS}$.

When current through resistor 62 flows from battery unit 58 toward system supply locus 70, apparatus 50 is providing power to system supply locus 70 from battery unit 58 via step-up current transfer unit 54. Current supplied to system supply locus 70 is provided by battery voltage $V_{BATT}$ plus inductor voltage $V_L$.

$$V_L = L \cdot \frac{dI}{dt} \qquad [1]$$

Where, L is inductance of inductor 60; and

I is current through inductor 60.

The factors dt and dI are substantially constant, so inductor voltage $V_L$ will substantially linearly discharge through high-side switch unit 84 to system supply locus 70. As a result, the current within current transfer unit 54 will have a triangular shape; closing 86 charges the inductor from the battery. Current will rise after low-side switch unit 86 closes until inductor voltage $V_L$ peaks, then fall after low-side switch unit 86 opens and high-side switch 84 closes as inductor voltage $V_L$ discharges through high-side switch 84 to system voltage $V_{SYS}$. Inductor voltage $V_L$ is added to the battery voltage $V_{BATT}$ resulting in a system voltage $V_{SYS}$ which is higher than battery voltage $V_{BATT}$. The cycle will repeat according to a switching cycle established by control device 56 using drive signals on drive lines 100, 102. Capacitor $C_1$ operates to smooth voltage provided to system supply locus 70. When configured for providing system voltage $V_{SYS}$ to system supply locus 70 from battery unit 58 apparatus 50 operates as a step-up converter. In the representative configuration illustrated in FIG. 2, apparatus 50 operates as a boost converter device. When configured for providing system voltage $V_{SYS}$ to system supply locus 70 from battery unit 58, apparatus 50 employs indicating signals received via indicating signal lines 91, 93, 95, 97 to determine the duty cycle of the switching cycle established by control device 56 using drive signals on drive lines 100, 102 to operate apparatus 50 in a manner to maximize certain parameters indicated by indicating signals received via indicating signal lines 91, 93, 95, 97 to strive for efficiency in step-up operation of apparatus 50.

If evaluation of voltage difference threshold $\Delta V_{TH}$ indicates that input voltage $V_{IN}$ is present or is providing system supply voltage $V_{SYS}$ to the host system at system supply locus 70, then apparatus 50 is in a configuration appropriate for input voltage $V_{IN}$ as system supply voltage $V_{SYS}$. When input voltage $V_{IN}$ is provided as system supply voltage $V_{SYS}$, current through resistor 62 flows from system supply locus 70 toward battery unit 58 and $V_{IN}$ is being applied via current transfer unit 54 by way of switching action of switch units 84, 86 to effect charging of battery unit 58.

When configured for providing system voltage $V_{SYS}$ to system supply locus 70 from input voltage $V_{IN}$ and using input voltage $V_{IN}$ to effect charging of battery unit 58, apparatus 50 employs indicating signals received via indicating signal lines 91, 93, 95, 97, 99 to determine the duty cycle of the switching cycle established by control device 56 using drive signals on drive lines 100, 102 to operate apparatus 50 to maximize certain parameters indicated by indicating signals received via indicating signal lines 91, 93, 95, 97, 99 to strive for efficiency and control in battery charging operation of apparatus 50.

Control device 56 receives indicating signals via indicating signal lines 95, 97 indicating direction and magnitude of current through resistor 62. The direction of current aids in determining whether apparatus 50 is charging battery unit 58. The magnitude of current through resistor 62 is useful for controlling charge level of battery unit 58. Current flow into a charging battery typically reduces as the battery approaches full charge. Control device 56 also receives an indicating signal via indicating signal line 99 indicating battery voltage $V_{BATT}$.

When configured to effect charging of battery unit 58, control device 56 operates much as any battery charger and operates essentially as a state machine that first provides a small current to battery unit 58 to ensure that there is a battery present and, if so, to ensure that the battery is not shorted. Too little current draw indicates no battery present, and too much current draw may indicate a shorted battery. Once a proper battery is sensed as being present, control device 56 may provide a greater current to charge battery unit 58. Control device 56 may also monitor battery voltage $V_{BATT}$ using indicating signals received via indicating signal line 99. When indicated voltage (i.e., the monitored voltage at battery unit 58 indicated by signals received via indicating signal line 99) approaches or reaches a desired battery voltage $V_{BATT}$, control unit 56 will again reduce current to battery unit 58 to a lower current level in order to avoid damaging battery unit 58 and keep indicated voltage substantially constant at the desired battery voltage $V_{BATT}$.

When configured to effect charging of battery unit 58, control device 56 is operating to maintain control of battery voltage and battery charging current, and uses indicator signals received via indicator signal lines 91, 93, 95, 97, 99 for ascertaining those targets. The two controlled parameters, referred to here as targets are battery voltage $V_{BATT}$ and battery current (measured as current through resistor 62).

Figure 3:
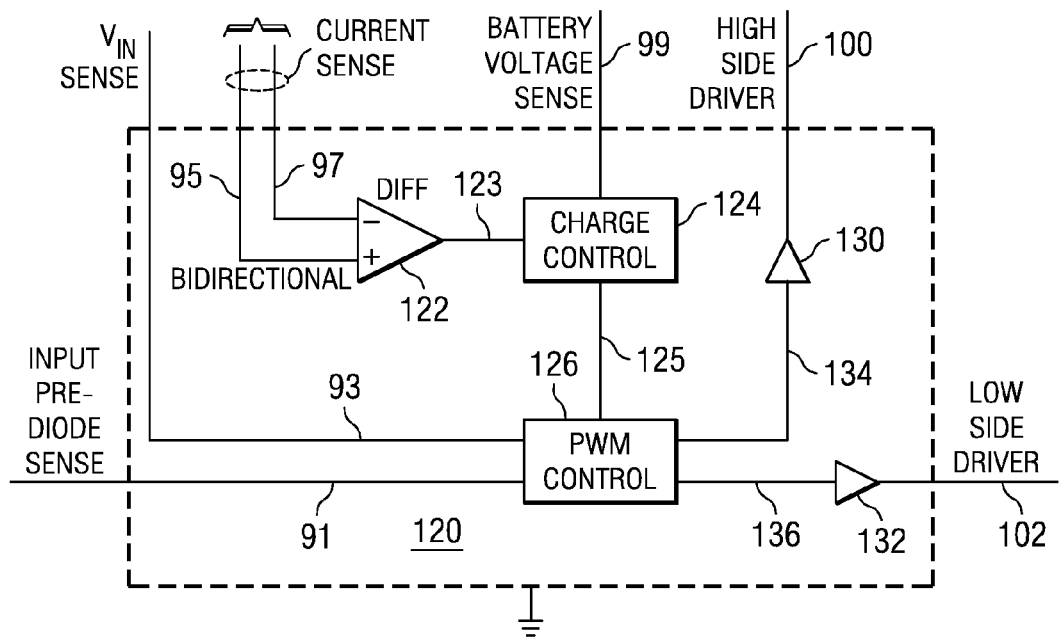
FIG. 3 is an electrical schematic diagram of the variable target controller employed in the exemplary apparatus illustrated in FIG. 2.

FIG. 3 is an electrical schematic diagram of the variable target controller employed in the exemplary apparatus illustrated in FIG. 2. In FIG. 3, a control device 120 includes a differential amplifier 122, a charge control unit 124, a PWM (Pulse Width Modulation) control unit 126, a high-side driver 130 and a low-side driver 132. Control device 120 is configured, by way of example and not by way of limitation, to substantially conform with control unit 56 in operating with power distribution control apparatus 50 (FIG. 2). In order to facilitate explanation of operation of control device 120, signal indicating lines coupled with control device 120 will be identified as they appear in power distribution control apparatus 50 (FIG. 2).

PWM control unit 126 receives input voltage indicating signal line 91 to provide an indication of the value of input voltage $V_{IN}$ in the parent power distribution control apparatus such as power distribution control apparatus 50 (FIG. 2; not shown in FIG. 3). PWM control unit 126 receives a system supply voltage indicating signal line 93 to provide an indication of the value of system supply voltage $V_{SYS}$ in the parent power distribution control apparatus. Differential amplifier 122 receives a current indicating signal line 95 and receives a current indicating signal line 97 to provide indications of the direction and magnitude of current in the parent power distribution control apparatus. Charge control unit 124 receives a battery voltage indicating signal line 99 to provide an indication of the value of battery voltage $V_{BATT}$ in the parent power distribution control apparatus.

PWM control unit 126 presents control signals via signal line 134 to a high-side driver 130. PWM control unit 126 presents control signals via signal line 136 to a low-side driver 132. High-side driver 130 provides control signals or drive signals to high-side switch unit 84 (FIG. 2) via a drive line 100. Low-side driver 132 provides control signals or drive signals to low-side switch unit 86 (FIG. 2) via a drive line 102.

PWM control unit 126 is coupled with indicating signal lines 91, 93 so that PWM control unit 126 may evaluate or compare indicating signals received via indicating signal lines 93 to observe a voltage difference $\Delta V$ between input voltage $V_{IN}$ and system supply voltage $V_{SYS}$. PWM control unit 126 may compare voltage difference $\Delta V$ with a predetermined voltage difference threshold $\Delta V_{TH}$ as a way to determine whether input voltage $V_{IN}$ is present and providing system supply voltage $V_{SYS}$ to the host system at system supply locus 70 (FIG. 2). Differential amplifier 122 is coupled with indicating signal lines 95, 97 so that differential amplifier 122 may evaluate or compare indicating signals received via indicating signal lines 95, 97. Indicating signals received via indicating lines 95, 97 are bidirectional in order to permit differential amplifier unit to indicate direction and magnitude of current to charge control unit 124 via an output signal presented on a signal line 123. If voltage difference threshold $\Delta V_{TH}$ indicates that input voltage $V_{IN}$ is not present and not providing system supply voltage $V_{SYS}$ to the host system at system supply locus 70 (FIG. 2), control unit 120 establishes duty cycle drive signals on drive lines 100, 102 for operating switch units 84, 86 (FIG. 2) to maximize parameters associated with step-up conversion operations so that the parent power distribution control apparatus may provide system supply voltage $V_{SYS}$ to the host system at system supply locus 70 (FIG. 2) from a battery unit via a step-up current transfer unit as described above in connection with FIG. 2.

When configured for battery supply operation (i.e., providing system voltage $V_{SYS}$ to system supply locus 70 from a battery unit), PWM control unit 126 employs indicating signals received via indicating signal line 93 to determine the duty cycle of the switching cycle established by control device 120 using drive signals on drive lines 100, 102 for effecting step-up conversion operations. Indicating signal line 99 provides information relating to battery voltage $V_{BATT}$ and is not useful in effecting step-up conversion operations. When configured for battery operation, PWM control unit 126 controls the duty cycle to maximize certain parameters indicated by indicating signals received via indicating signal line 93 to strive for efficiency in step-up operation of the parent power distribution control apparatus (e.g., apparatus 50; FIG. 2).

If evaluation of voltage difference threshold $\Delta V_{TH}$ indicates to PWM control unit 126 that input voltage $V_{IN}$ is present or is providing system supply voltage $V_{SYS}$ to the host system at system supply locus 70, control system 120 may further employ indicating signals received by differential amplifier 122 via indicating signal lines 95, 97 and indicating signals received by charge control unit 124 via indicating signal line 99 to establish duty cycle drive signals on drive lines 100, 102 for operating switch units 84, 86 (FIG. 2) to maximize parameters associated with battery charging operations so that the parent power distribution control apparatus may provide input voltage $V_{IN}$ as system supply voltage $V_{SYS}$ and employ input voltage $V_{IN}$ to effect charging of a battery unit in the parent power distribution control apparatus.

When configured for powered operation (i.e., providing system voltage $V_{SYS}$ using input voltage $V_{IN}$ and using input voltage $V_{IN}$ to effect charging of a battery unit), PWM control unit 126 employs signals from signal line 99 through the charge control 124, differential amplifier 122 employs indicating signals received via indicating signal lines 95, 97 and charge control unit employs indicating signals received via indicating signal line 99 and an output signal from differential amplifier 122 to cooperatively determine the duty cycle of the switching cycle established by control device 120 using drive signals on drive lines 100, 102. When configured for powered operation, control device 120 operates to control the duty cycle to maximize certain parameters indicated by indicating signals received via indicating signal lines 95, 97, 99 to control battery voltage $V_{BATT}$ and battery current.

Differential amplifier 122 receives indicating signals via indicating signal lines 95, 97 indicating direction and magnitude of current through the host power distribution control apparatus and presents an output signal indicating direction and magnitude of current on a signal line 123 to charge control unit 124. The direction of current aids in determining whether the host power distribution control apparatus is charging a battery unit. The magnitude of current through the host power distribution control apparatus is useful for controlling charge level of a battery unit being charged. Current flow into a charging battery typically reduces as the battery approaches full charge. Charge control unit 124 receives an indicating signal via indicating signal line 99 indicating battery voltage $V_{BATT}$.

When configured for powered operation, control device 120 operates much as any battery charger and operates essentially as a state machine that first provides a small current to the battery unit being charged to ensure that there is a battery present and, if so, to ensure that the battery is not shorted. Too little current draw indicates no battery present, and too much current draw indicates a shorted battery. Once a proper battery is sensed as being present, control device 120 may provide a greater current to charge the battery unit.

Charge control unit 124 monitors battery voltage $V_{BATT}$ using indicating signals received via indicating signal line 99. Charge control unit 124 also uses the signal received from differential amplifier 122 via a signal line 123 to confirm that a battery unit is present and is not shorted, and indicates the amount of current being provided to the battery unit being charged. Charge control unit 124 provides a state-indicating signal to PWM control unit 126 via a signal line 125 that indicates state of charge of the battery unit being charged. When indicated voltage (i.e., the monitored voltage at the battery unit indicated by signals received via indicating signal line 99) approaches or reaches a desired battery voltage $V_{BATT}$, charge control unit 124 will provide a changed state signal to PWM control unit 126. In response to the state signal received via signal line 125, PWM control unit 126 controls drive signals presented at drive lines 100, 102 to change duty cycle of operation of the driven high-side switch unit (e.g., high-side switch unit 84; FIG. 2) and the driven low-side switch unit (e.g., low-side switch unit 86; FIG. 2) to reduce current to the battery unit being charged to a lower current level in order to keep indicated voltage substantially constant at battery voltage $V_{BATT}$.

When configured for powered operation, control device 120 has dual targets, and uses indicator signals received via indicator signal lines 91, 93, 95, 97, 99 for ascertaining those targets. The two targets are battery voltage $V_{BATT}$ and battery current.

Figure 4:
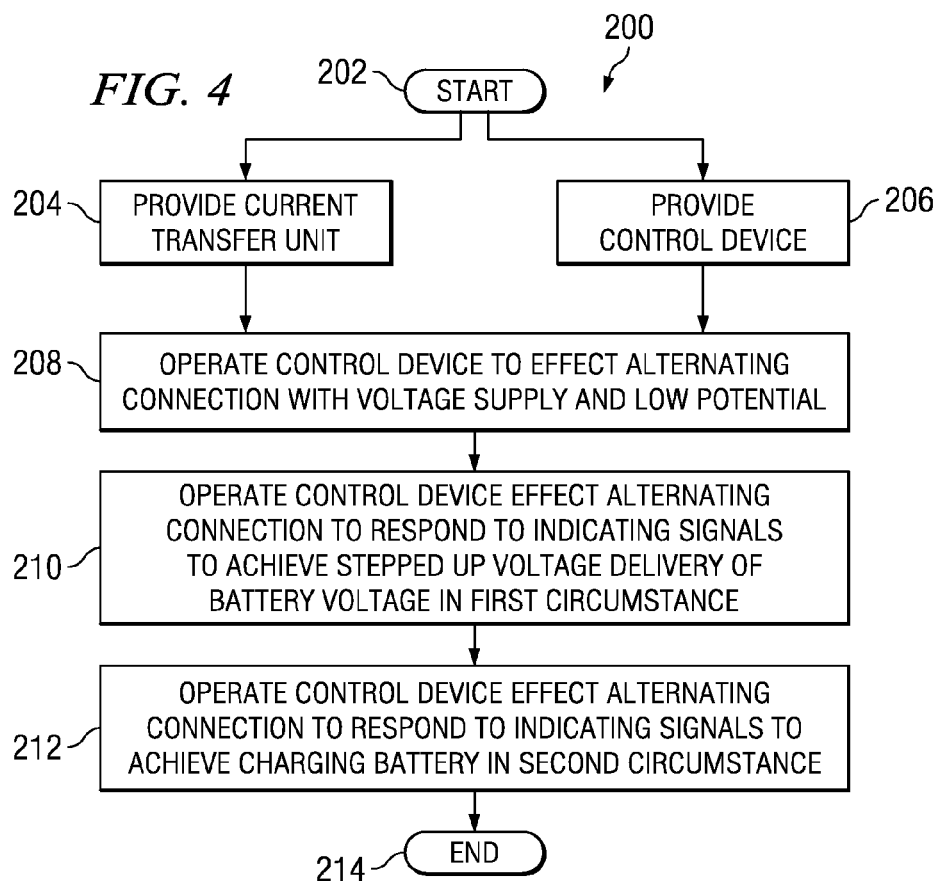
FIG. 4 is a flow chart illustrating the method of the present invention.

FIG. 4 is a flow chart illustrating the method of the present invention. In FIG. 4, a method 200 for effecting power distribution to a host system at a system supply locus from one of a voltage supply source or a battery unit begins at a START locus 202. Method continues with, in no particular order: (1) providing a current transfer unit having a first connection locus and a second connection locus, as indicated by a block 204; and (2) providing a control device switchingly coupled with the first connection locus, as indicated by a block 206. The second connection locus is coupled with the battery unit. The control device is sensingly coupled with the voltage supply source and within the apparatus for receiving a plurality of indicating signals.

Method 200 continues with operating the control device to effect generally alternating connection with the voltage supply source and with a system low potential locus, as indicated by a block 208. Method 200 continues with operating the control device to respond to the plurality of indicating signals to control the generally alternating connection to achieve stepped up voltage delivery of voltage presented by the battery unit to the system supply locus when the plurality of indicating signals indicate a first circumstance, as indicated by a block 210. Method 200 continues with operating the control device to respond to the plurality of indicating signals to switchingly control the generally alternating connection to achieve charging the battery unit when the plurality of indicating signals indicate a second circumstance, as indicated by a block 212. Method 200 terminates at an END locus 214.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. An apparatus for effecting power distribution to a host system at a system supply locus from one of a voltage supply source or a battery unit; the apparatus comprising:
   (a) a current transfer unit having a first connection locus and a second connection locus; said second connection locus being coupled with said battery unit; and
   (b) a control device switchingly coupling said first connection locus to effect generally alternating connection with said voltage supply source and with a system low potential locus; said control device being sensingly coupled with said voltage supply source and within the apparatus for receiving a plurality of indicating signals, the plurality of indicating signals comprising indicators of input voltage, system supply voltage, battery voltage, battery current magnitude and direction;
   said control device responding to said plurality of indicating signals to control said generally alternating connection to achieve stepped up voltage delivery of voltage presented by said battery unit to said system supply locus when said plurality of indicating signals indicate a first circumstance; said control device responding to said plurality of indicating signals to switchingly control said generally alternating connection to achieve charging said battery unit when said plurality of indicating signals indicate a second circumstance said control device being adapted to switchingly disconnect the first connection locus from both the voltage supply source and the system low potential locus before each alternating connection of the first connection locus to the voltage supply source and the system low potential locus.

2. An apparatus for effecting power distribution to a host system at a system supply locus from one of a voltage supply source or a battery unit as recited in claim 1 wherein at least one first selected indicating signal of said plurality of indicating signals relates to magnitude of voltage provided at said voltage supply source; said at least one first selected indicating signal indicating one of said first circumstance and said second circumstance.

3. An apparatus for effecting power distribution to a host system at a system supply locus from one of a voltage supply source or a battery unit as recited in claim 1 wherein at least one second selected indicating signal of said plurality of indicating signals relates to state of charge of said battery unit; said generally alternating connection being controlled in a manner seeking to substantially maximize said at least one second selected indicating signal when said plurality of indicating signals indicate said second circumstance.

4. An apparatus for effecting power distribution to a host system at a system supply locus from one of a voltage supply source or a battery unit as recited in claim 1 wherein at least one third selected indicating signal of said plurality of indicating signals relates to stepped up signal boost operation by said current transfer unit; said generally alternating connection being controlled in a manner seeking to substantially maximize said at least one third selected indicating signal when said plurality of indicating signals indicate said first circumstance.

5. An apparatus for effecting power distribution to a host system at a system supply locus from one of a voltage supply source or a battery unit as recited in claim 2 wherein at least one second selected indicating signal of said plurality of indicating signals relates to state of charge of said battery unit; said generally alternating connection being controlled in a manner seeking to substantially maximize said at least one second selected indicating signal when said at least one first selected indicating signal indicates said second circumstance.

6. An apparatus for effecting power distribution to a host system at a system supply locus from one of a voltage supply source or a battery unit as recited in claim 2 wherein at least one third selected indicating signal of said plurality of indicating signals relates to stepped up signal boost operation by said current transfer unit; said generally alternating connection being controlled in a manner seeking to substantially maximize said at least one third selected indicating signal when said at least one first selected indicating signal indicates said first circumstance.

7. An apparatus for effecting power distribution to a host system at a system supply locus from one of a voltage supply source or a battery unit as recited in claim 5 wherein at least one third selected indicating signal of said plurality of indicating signals relates to stepped up signal boost operation by said current transfer unit; said generally alternating connection being controlled in a manner seeking to substantially maximize said at least one third selected indicating signal when said at least one first selected indicating signal indicates said first circumstance.

8. An apparatus controlling power to a host system from a voltage supply locus or from a battery; the apparatus comprising:
   (a) a boost converter unit coupled between said battery and a first connection locus; said boost converter unit being oriented for stepping up signals from said battery for presenting as boosted signals at said first connection locus; and
   (b) a control device switchingly coupling said first connection locus to effect generally alternating connection with said voltage supply source and with a system low potential locus; said control device being sensingly coupled with said voltage supply source and within the apparatus for receiving a plurality of indicating signals, the plurality of indicating signals comprising indicators of input voltage, system supply voltage, battery voltage, battery current magnitude and direction;
   said control device responding to said indicating signals to control said generally alternating connection to said boosted signals to said system supply locus when said plurality of indicating signals indicate a first circumstance; said control device responding to said indicating signals to switchingly control said generally alternating connection to achieve charging said battery when said plurality of indicating signals indicate a second circumstance, said control device being adapted to switchingly disconnect the first connection locus from both the voltage supply source and the system low potential locus before each alternating connection of the first connection locus to the voltage supply source and the system low potential locus.

9. An apparatus controlling power to a host system from a voltage supply locus or from a battery as recited in claim 8 wherein at least one first selected indicating signal of said plurality of indicating signals relates to magnitude of voltage provided at said voltage supply source; said at least one first selected indicating signal indicating one of said first circumstance and said second circumstance.

10. An apparatus controlling power to a host system from a voltage supply locus or from a battery as recited in claim 8 wherein at least one second selected indicating signal of said plurality of indicating signals relates to state of charge of said battery; said generally alternating connection being controlled in a manner seeking to substantially maximize said at least one second selected indicating signal when said plurality of indicating signals indicate said second circumstance.

11. An apparatus controlling power to a host system from a voltage supply locus or from a battery as recited in claim 8 wherein at least one third selected indicating signal of said plurality of indicating signals relates to stepped up signal boost operation by said boost converter unit; said generally alternating connection being controlled in a manner seeking to substantially maximize said at least one third selected indicating signal when said plurality of indicating signals indicate said first circumstance.

12. An apparatus controlling power to a host system from a voltage supply locus or from a battery as recited in claim 9 wherein at least one second selected indicating signal of said plurality of indicating signals relates to state of charge of said battery; said generally alternating connection being controlled in a manner seeking to substantially maximize said at least one second selected indicating signal when said at least one first selected indicating signal indicates said second circumstance.

13. An apparatus controlling power to a host system from a voltage supply locus or from a battery as recited in claim 9 wherein at least one third selected indicating signal of said plurality of indicating signals relates to stepped up signal boost operation by said boost converter unit; said generally alternating connection being controlled in a manner seeking to substantially maximize said at least one third selected indicating signal when said at least one first selected indicating signal indicates said first circumstance.

14. An apparatus controlling power to a host system from a voltage supply locus or from a battery as recited in claim 12 wherein at least one third selected indicating signal of said plurality of indicating signals relates to stepped up signal boost operation by said boost converter unit; said generally alternating connection being controlled in a manner seeking to substantially maximize said at least one third selected indicating signal when said at least one first selected indicating signal indicates said first circumstance.

15. A method for effecting power distribution to a host system at a system supply locus from one of a voltage supply source or a battery unit; the method comprising the steps of:
  (a) in no particular order:
    (1) providing a current transfer unit having a first connection locus and a second connection locus; said second connection locus being coupled with said battery unit; and
    (2) providing a control device switchingly coupled with said first connection locus; said control device being sensingly coupled with said voltage supply source and within the apparatus for receiving a plurality of indicating signals, the plurality of indicating signals comprising indicators of input voltage, system supply voltage, battery voltage, battery current magnitude and direction;
  (b) operating said control device to effect generally alternating connection with said voltage supply source and with a system low potential locus;
  (c) operating said control device to respond to said plurality of indicating signals to control said generally alternating connection to achieve stepped up voltage delivery of voltage presented by said battery unit to said system supply locus when said plurality of indicating signals indicate a first circumstance; and
  (d) operating said control device to respond to said plurality of indicating signals to switchingly control said generally alternating connection to achieve charging said battery unit when said plurality of indicating signals indicate a second circumstance, said control device being adapted to switchingly disconnect the first connection locus from both the voltage supply source and the system low potential locus before each alternating connection of the first connection locus to the voltage supply source and the system low potential locus.

16. A method for effecting power distribution to a host system at a system supply locus from one of a voltage supply source or a battery unit as recited in claim 15 wherein at least one first selected indicating signal of said plurality of indicating signals relates to magnitude of voltage provided at said voltage supply source; said at least one first selected indicating signal indicating one of said first circumstance and said second circumstance.

17. A method for effecting power distribution to a host system at a system supply locus from one of a voltage supply source or a battery unit as recited in claim 15 wherein at least one second selected indicating signal of said plurality of indicating signals relates to state of charge of said battery unit; said generally alternating connection being controlled in a manner seeking to substantially maximize said at least one second selected indicating signal when said plurality of indicating signals indicate said second circumstance.

18. A method for effecting power distribution to a host system at a system supply locus from one of a voltage supply source or a battery unit as recited in claim 15 wherein at least one third selected indicating signal of said plurality of indicating signals relates to stepped up signal boost operation by said current transfer unit; said generally alternating connection being controlled in a manner seeking to substantially maximize said at least one third selected indicating signal when said plurality of indicating signals indicate said first circumstance.

19. A method for effecting power distribution to a host system at a system supply locus from one of a voltage supply source or a battery unit as recited in claim 16 wherein at least one second selected indicating signal of said plurality of indicating signals relates to state of charge of said battery unit; said generally alternating connection being controlled in a manner seeking to substantially maximize said at least one second selected indicating signal when said at least one first selected indicating signal indicates said second circumstance.

20. A method for effecting power distribution to a host system at a system supply locus from one of a voltage supply source or a battery unit as recited in claim 16 wherein at least one third selected indicating signal of said plurality of indicating signals relates to stepped up signal boost operation by said current transfer unit; said generally alternating connection being controlled in a manner seeking to substantially maximize said at least one third selected indicating signal when said at least one first selected indicating signal indicates said first circumstance.

* * * * *